United States Patent Office 3,202,626

Patented Aug. 24, 1965

3,202,626

MODIFIED POLYTETRAFLUOROETHYLENE DISPERSIONS AND SOLID PRODUCTS

Vincent G. FitzSimmons, McLean, Va., and William A. Zisman, Silver Spring, Md., assignors to the United States of America as represented by the Secretary of the Navy No Drawing. Filed Dec. 28, 1961, Ser. No. 163,382
4 Claims. (Cl. 260—29.6)
(Granted under Title 35, U.S. Code (1952), sec. 266)

The invention described herein may be manufactured and used by or for the Government of the United States of America for governmental purposes without the payment of any royalties thereon or therefor.

This invention relates to modified aqueous dispersions of polytetrafluoroethylene, more particularly to the preparation of aqueous thixotropic dispersions of polytetrafluoroethylene and surface modified colloidal fibrillar boehmite alumina.

Polytetrafluoroethylene is a soft waxy solid of high resistance to chemical action, friction, and adhesion. It has a low coefficient of friction and is attractive as a solid type lubricant. The polymer is available commercially as a fine powder and as aqueous colloidal dispersions.

Coatings of polytetrafluoroethylene are formed on metal and the like substrates by applying a film of the polymer from aqueous colloidal dispersion and sintering the film on the substrate. Sintering is conducted by heating the film to above the fusion point (621° F.) of polytetrafluoroethylene. A characteristic of polytetrafluoroethylene is that in the molten state it does not flow, being a melt of very high viscosity. For this reason, the cohesive strength of the polymer is limited to that developed by coalescence of the molten polymer particles at their areas of contact and hence there is low internal cohesion. When light loads are applied or where frictional heating occurs, sintered polytetrafluoroethylene will deform and cold-flow.

It has been common practice to use inorganic flake, powder or fibers to reinforce polytetrafluoroethylene. To be effective an addition of 30% by weight or more of the reinforcing agent on the polymer is required. Additionally, the average particle size of the reinforcing agent has in general been as large or larger than the particle size of the polytetrafluoroethylene. In systems of this kind, the mechanism of reinforcement is based primarily on the physical properties of the reinforcing agent as mechanically restrained by the polymer. Thus, ultimately, the properties of such mixtures depend to a large extent on the degree to which polytetrafluoroethylene will function as a bonding agent therein. The effect, generally, is one of bulk reinforcement.

Commercial mixing procedures for incorporating reinforcing agents in polytetrafluoroethylene, while simple, require elaborate care and a number of repetitive steps in order to provide uniform products. When considerable proportions of the reinforcing agent are used, the resulting products are often inferior to polytetrafluoroethylene, alone, in respect to some properties.

Commercially available aqueous dispersions of polytetrafluoroethylene are usually prepared with the aid of a wetting agent as dispersing agent for the fine polymer particles. In another form, the aqueous-dispersion of the polymer is rendered alkaline by addition of ammonia, and stabilized for shipment through the presence therein of an immiscible liquid hydrocarbon which can be easily removed from the dispersion by decantation. These polymer dispersions have a short storage life at ordinary temperatures, i.e., from about 60° to 100° F. undergoing partial or complete coagulation within a period of about six weeks. Once separation takes place, the dispersions cannot be reconstituted by stirring. Practice is to store the dispersions under refrigeration at 40° to 45° F. whereby the usable life of the dispersions can be extended to a period of from about four to six months. The dispersions also lack stability to strong agitation or rapid motion. Extrusion molding cannot be successfully practiced with these dispersions due to premature separation of the aqueous phase. In spraying such dispersions, there is a general tendency to coagulation with formation of agglomerates of polymer particles due to the strong agitation to which the dispersion is subjected in the spray gun. The agglomerates will partially plug the spray orifice and cause spraying of blobs of the agglomerates. Eventually they will completely plug the spray orifice with cessation of spraying.

It is an object of the present invention to provide new, modified aqueous dispersions of polytetrafluoroethylene which exhibit improved stability to heat and strong agitation. It is also an object to provide new, modified dispersions of this kind from which can be obtained films and solid shapes of polytetrafluoroethylene of improved cohesive strength. It is a further object to provide new, modified aqueous dispersions of this kind which can be successfully used in extrusion molding of polytetrafluoroethylene. It is another object to provide new solid shapes of polytetrafluoroethylene.

The above and other object are accomplished following the present invention through the preparation of aqueous thixotropic dispersions of polytetrafluoroethylene which contain a small amount of colloidal boehmite alumina fibrils bearing absorbed acetate ions in amount corresponding to form about 8 to 11% acetic acid on the weight of the alumina fibrils. The amount of the alumina fibrils bearing absorbed acetate ions in the new, thixotropic dispersions may be from about 0.1 to 5% by weight on the polytetrafluoroethylene. In a preferred group of the new dispersions of the invention, the amount of the boehmite alumina fibrils bearing adsorbed acetate ions is from about 3 to 5% by weight on the polytetrafluoroethylene.

New aqueous thixotropic dispersions of the invention may be prepared by adding an aqueous sol of the colloidal boehmite alumina fibrils bearing adsorbed acetate ions in the appropriate amount to and admixing it with an aqueous dispersion of polytetrafluoroethylene which is acidic or rendered acidic by the addition of a suitable acid, such as hydrochlorid, nitric, phosphoric or acetic acid, and stabilized by means of a wetting agent which is a dispersant for the fine polymer particles, for example, the commercial surface-active agent which is described as the sodium salt of the sulfuric acid ester of mixed long chain alcohols, predominantly lauryl alcohol, derived from coconut oil fatty acids and sold under the trade name Duponol ME. Aqueous dispersions of polytetrafluoroethylene of this kind are available commercially. Such as contain chromic and phosphoric acids are described in U.S. Patent 2,562,118.

New aqueous thixotropic dispersions of the invention may be prepared by starting with an aqueous ammoniacal dispersion of polytetrafluoroethylene which is ammoniacal and stabilized for shipment by the presence therein of a liquid immiscible hydrocarbon, decanting the liquid hydrocarbon, from the polymer dispersion, adding the aqueous sol thereto, and thereafter adding ammonium hydroxide to the resulting dispersion to render it alkaline to a pH of about 8.

The aqueous colloidal sol added to the aqueous dispersions of polytetrafluoroethylene for preparation of the new thixotropic dispersions may be prepared by simply adding a power of the colloidal beohmite alumina fibrils bearing adsorbed acetate groups to water and stirring.

The powder readily disperses in water to form acidic sols. The concentration of the colloidal boehmite alumina fibrils bearing adsorbed acetate ions in the sols may be varied and range for example, from about 5% up to about 10% by weight. Powders of the colloidal boehmite alumina (AlOOH) fibrils bearing adsorbed acetate groups may be prepared as described in U.S. Patent 2,915,475 to Bugosh. Powders of this kind are available commercially under the trade name Baymal.

In the formation of the new aqueous thixotropic dispersions, a new system is set up in which is present polytetrafluoroethylene particles which are negatively charged and colloidal fibrillar boehmite alumina particles which are positively charged. The latter bear a positive charge due to the presence of the adsorbed acetate ions thereon. The presence of the oppositely charged particles in the aqueous dispersion develops electrostatic forces which attract the positively charged smaller boehmite alumina particles to the negatively charged polytetrafluoroethylene particles until the charges on the polytetrafluoroethylene particles are neutralized. The result of this electrostatic bonding together of the different particles in the aqueous dispersions is a reinforcing effect for coating or solid shapes of polytetrafluoroethylene which is supplementary to the strong cohesion existing between adjacent colloidal boehmite alumina fibrils and to the bulk or mechanical force of the fibrils. Another beneficial result of the presence of the positively charged colloidal boehmite alumina fibrils in the modified dispersions is the development of a thixotropic gel. The gel structure so produced, in which a random and interlocked structure of fibers is developed throughout the aqueous phase of the dispersion, is able, in the absence of applied shearing stresses, to support the polytetrafluoroethylene particles and decrease settling whereby there are produced aqueous polymer particle dispersions of enhanced stability or resistance to irrevocable coagulation under warm conditions of storage or strong agitation.

The invention is further illustrated by the following specific examples in which parts are by weight.

*Example 1*

Four parts of an aqueous sol (pH about 4) containing 5% colloidal boehmite alumina fibrils bearing adsorbed acetate ions in amount corresponding to 10% acetic acid on the alumina fibrils is added with gentle stirring to 100 parts of an acidic aqueous dispersion of finely divided polytetrafluoroethylene containing 50 parts of the polymer which is acidified with chromic and phosporic acids to pH about 3 and stabilized with 3% on the polymer of the wetting agent Duponol ME. The codispersion so obtained is an aqueous thixotropic gel of pH slightly above 3 in which the content of the colloidal beohmite alumina fibrils modified with adsorbed acetate ions is about 0.4% on the polytetrafluoroethylene.

*Example 2*

Acidic aqueous thixotropic codispersions similar to that which is prepared by the procedure of Example 1 but which contain about 3% and about 5%, respectively, on the polytetrafluoroethylene of the colloidal boehmite alumina fibrils bearing adsorbed acetate ions are prepared following the procedure of Example 1 by the addition to the acidic aqueous polytetrafluoroethylene dispersion of, respectively, 30 parts and 50 parts of the aqueous 5% sol.

*Example 3*

An ammoniacal aqueous dispersion of polytetrafluoroethylene of pH 10 containing kerosene to stabilize it for shipment and no other additive and known as Teflon 41BX is placed in a separatory flask and the kerosene removed from it. To 1000 parts of the kerosene-free ammoniacal aqueous dispersion containing 600 parts of polytetrafluoroethylene of average particle size of 0.2 micron is added, with gentle stirring, a thick sol or slurry in water of 2.4 parts of a powder of colloidal boehmite alumina fibrils bearing adsorbed acetate ions in amount corresponding to 10% acetic acid on the alumina fibrils. The resulting dispersion is an acidic and non-thixotropic fluid in which the content of colloidal boehmite alumina fibrils bearing adsorbed acetate ions is about 0.4% on the polytetrafluoroethylene. The acidic dispersion may be made thixotropic by the addition of ammonium hydroxide (37%) dropwise thereto with gentle stirring until the pH of the codispersion is above 7 and up to about 8, at which point the codispersion is a gel, granular in character, containing all of the water of the aqueous starting materials. The appearance of the ammoniacal gel dispersion is that of mashed potatoes. It is indefinitely stable in glass (non-metallic) containers at temperatures of 65 to 100° F.

Thixotropic ammoniated granular gel dispersions prepared by the procedure of Example 3 and which contain from about 0.1 to 5% by weight on the polytetrafluoroethylene of the colloidal beohmite alumina fibrils bearing adsorbed acetate ions can be formed into hard, extremely strong, waxy sheets which have none of the soft feel of sintered polytetrafluoroethylene. The loose gel-like thixotropic dispersion is subjected to rolling with a cylindrical weight to expel water and form a loosely-bonded plastic sheet which can be picked up. The plastic sheet thus formed is then subjected to shearing stress by rolling under high pressure in a rubber mill to form a tough, translucent sheet which is then sintered at 750° F. for 10 minutes. A 25 mil thick sheet so formed and in which the content of the colloidal alumina fibrils bearing adsorbed acetate ions is about 0.4% by weight on the polytetrafluoroethylene has a tensile strength of the order of 3000 p.s.i. in the oriented axis and elongation at break of the order of 400%. This is to be compared with a tensile strength of 210 p.s.i. and an elongation of 25% for commercial cast (non-reinforced) Teflon (polytetrafluoroethylene) sheet. Shearing stress applied to the polymer orients the alumina fibrils therein to increase the tensile strength of the reinforced polymer. The effectiveness of a content of only about 0.4% by weight of the alumina fibrils modified by adsorbed acetate ions in fibril oriented condition as reinforcement for the polymer is such as to require an addition on the order of 25% by weight of other inorganic fillers to produce comparable tensile strength in the polymer.

Thixotropic ammoniated granular gel dispersions of pH up to about 8 prepared in the manner of Example 3 and which contain from about 0.1 to 5% by weight on the polymer of the colloidal boehmite alumina fibrils bearing adsorbed acetate ions may be used for forming shapes by pressure molding. Under application of low pressure, without shear, separation of the solid and liquid phases proceeds in the gel with expelling of water and the coagulant can be easily forced into complicated cavities as long as not all the water is expelled from it. As water removal occurs, increasingly greater force is required to cause the coagulant to flow into the cavities. When mold cavities are filled under low pressure, forced drying, followed by sintering of the shape in the metal mold will produce low density, porous, hard castings which have good conformation to the mold cavity. Such molded pieces are well bonded, but can be crushed more readily than comparable pieces formed under high compression. The reduction in weight due to porosity which is obtained in low pressure molding is of advantage in electrical applications and for thermal insulation. Such structures, because of their porous character, may be made into useful filters.

If the castings are not dried and sintered, they may remove the alumina and leave a porous skeleton of polytetrafluoroethylene which may be sintered.

With application of mild shearing stresses as in extrusion molding, aqueous, ammoniacal granular gel dispersions of such low content of the colloidal boehmite alumina fibrils bearing adsorbed acetate ions may be processed to complex shapes while at the same time obtaining orientation in the formed solid shape of both the polymer particles and the boehmite alumina fibrils. Thereafter, the water remaining in the solid shapes may be expelled therefrom under application of pressure or by drying to give products which are stronger and more dense. Subsequent sintering of the dewatered shapes will develop an even greater density, cohesion and strength in the completely oriented products.

Sintering of the shapes will remove the acetate ions from the shapes and dehydrate the colloidal boehmite alumina fibrils to give structures in which the dehydrated boehmite alumina fibrils are bonded to the polytetrafluoroethylene and to each other. Other cohesive forces, unlike those usually found in reinforced polytetrafluoroethylene, are developed in the final sintered products from the electrostatic forces bonding the colloidal alumina fibrils to polyetetrafluoroethylene particles and from intermolecular cohesive forces bonding these colloidal alumina fibrils to each other. The sintered solid shapes may be linearly oriented or non-oriented structures of polytetrafluoroethylene in which the content of the dehydrated boehmite alumina fibrils may range from about 0.1 to 4.5% by weight on the polytetrafluoroethylene. The sintered linearly oriented solid shapes are tough structures.

Finishes which are aqueous dispersions of polytetrafluoroethylene containing a wetting agent as particle dispersant and an acid electrolyte, such as chromic acid or phosphoric acid or both, and pigmented or not may be more easily sprayed and improved in stability to motion incurred in operation of spray guns by inducing thixotropy in such dispersions through the incorporation therein of a small amount of the colloidal boehmite alumina fibrils which are positively charged by the presence thereon of adsorbed acetate ions. The amount of the aforesaid colloidal alumina fibrils mixed with the aqueous polymer finishes to induce the desired degree of thixotropy in the modified dispersions may range from about 0.1 to 5% by weight on the polytetrafluoroethylene, with selection as to amount in each instance being made on the basis of the threshold concentration required for onset of thixotropy and the extent of thixotropy induced in a particular polymer dispersion. The viscosity of thixotropic finishes for spraying in an aspirator type spray gun in continuous manner can be adjusted by controlling the addition of the positively-charged boehmite alumina fibrils and the pH on the acid side to obtain the desired consistency in the dispersions. A pH of between about 3 to 4 in the dispersions will generally give good results. A concentration, for example, of about 0.4% by weight of the colloidal boehmite alumina fibrils bearing adsorbed acetate ions dispersed in commercial aqueous dispersions of polytetrafluoroethylene of the type described in U.S. Patent 2,562,118 which contain about 50% by weight polytetrafluoroethylene, about 10% by weight green pigment, a small amount of Duponol ME as dispersing or wetting agent, a small amount each of chromic acid and phosphoric acid acidifying the dispersions to a pH of a bout 3, and in the one dispersion, additionally, a small amount of emulsified toluene, provides a degree of the thixotropy in the modified dispersions to cause them to spray much more easily than the not-so-modified dispersions and to give a fine-grained appearance to the resulting coatings (sintered) on the metal panels. The dispersions so-modified following the present invention show complete freedom from the problems of agglomeration and plugging of the orifice of the spray gun (aspirator type) and the occurrence of agglomerate blobs or "spits" on the coating.

Improvement in storage stability at warm temperatures, e.g., 65 to 100° F. of modified aqueous polytetrafluoroethylene acidic dispersions of the present invention is demonstrated by the results obtained on subjecting to shelf-storage in glass containers for a period of twelve months, during which time the room temperature varied from about 68 to 98° F., samples of the commercial aqueous polytetrafluoroethylene dispersions described immediately above which had been modified following the invention to contain about 0.4 by weight on the polytetrafluoroethylene content of the positively charged colloidal boehmite alumina fibrils along with samples of the unmodified polymer dispersions as controls. The samples of the thixotropic modified dispersions were readily redispersible with mild agitation after the end of the twelve month storage period. The control samples of the unmodified polymer dispersions, on the other hand, were partially or completely irreversibly coagulated at the conclusion of a three month storage period. In the thixotropic modified polymer dispersions the gel structure acts as a fluid matrix which in shelf storage greatly retards settling of the polymer or other solid particles from the aqueous phase.

Lubricating films which are superior to sintered polytetrafluoroethylene films in durability and resistance to cold-flow under service conditions and without loss in the low coefficient of friction of polytetrafluoroethylene are obtained with the use as the film former on the metal or other hard substrate of aqueous thixotropic polymer dispersions as defined hereinabove which are of pH about 3 to 4 and contain small amounts of chromic acid and optionally, additionally, of phosphoric acid and wherein the colloidal boehmite alumina fibrils bearing adsorbed acetate ions are present to the extent of from about 1% to 5%, preferably from about 3 to 5%, by weight on the polytetrafluoroethylene, and sintering of the formed film on the substrate. In thicknesses of from about 1 to 1.5 mils and subjected to stresses occurring on movement of a load under high compression thereover, orientation of alumina fibrils in the films will take place. This orientation will develop toughness in the films with resultant marked increase in the durability and resistance to cold-flow of the films under service conditions. A break-in orientation pre-treatment of the films may be practiced by subjecting them to a rolling or sliding load of light magnitude which is sufficient to make perceptible rubbing contact with the surface of the film.

The effect of breaking-in orientation is to be observed only for the films which are of a thickness of at 1*e* least 1 mil. Films of 0.5 mil on a metal substrate showed no observable effect on application of breaking-in orientation. The applied load in such case was supported by the metal substrate because of the thinness of the film and the film could not yield and flow under load to become oriented.

The aqueous thixotropic polytetrafluoroethylene dispersions of the invention are useful in the production of seals, gaskets, bearing materials and tubing and in other instances where resistance to deformation and abrasion is required.

Since the invention may be variously practiced without departing from the spirit or scope thereof, it is not intended that it shall be limited except as is required by the appended claims.

What is claimed is:

1. An aqueous ammoniacal thixotropic gel dispersion of pH in the range of from above 7 up to 8 of polytetrafluoroethylene and colloidal boehmite alumina fibrils which bear adsorbed acetate ions in amount corresponding to from about 8 to 11% by weight acetic acid thereon, said colloidal alumina fibrils bearing adsorbed acetate ions being present in a proportion of from about 0.1 to 5% by weight on the polytetrafluoroethylene.

2. A method of forming solid shapes which comprises shaping a quantity of an aqueous ammoniacal thixotropic granular gel dispersion of pH in the range of from above 7 up to about 8 of polytetrafluoroethylene and colloidal boehmite alumina fibrils bearing adsorbed acetate ions in amount corresponding to from about 8 to 11% by weight acetic acid thereon, said colloidal boehmite alumina fibrils bearing adsorbed acetate ions being present in the dispersion in a proportion of from about 0.1 to 5% by weight on the polytetrafluoroethylene, with gradual elimination of water therefrom until the solid shape is formed.

3. A method as defined in claim 2 and drying the formed solid shape and thereafter sintering the dried solid shape.

4. A method as defined in claim 2 and applying a shearing stress to the formed solid shape of said aqueous gel dispersion which linearly orients the polytetrafluoroethylene particles and the colloidal boehmite alumina fibrils in the formed solid shape, drying the formed solid shape and thereafter sintering the dried solid shape.

References Cited by the Examiner

UNITED STATES PATENTS

| | | | |
|---|---|---|---|
| 2,915,475 | 12/59 | Bugosh | 252—313 |
| 2,961,712 | 11/60 | Davis | 18—55 |

MURRAY TILLMAN, *Primary Examiner.*

WILLIAM A. SHORT, *Examiner.*